United States Patent
Lee et al.

(10) Patent No.: US 8,488,515 B2
(45) Date of Patent: Jul. 16, 2013

(54) DATA TRANSMISSION METHOD IN COMMUNICATION SYSTEM AND RELAY APPARATUS PERFORMING THE SAME

(75) Inventors: Kyoung Seok Lee, Daejeon (KR); Jae Heung Kim, Daejeon (KR); Taegyun Noh, Daejeon (KR); Jae Young Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 452 days.

(21) Appl. No.: 12/818,759

(22) Filed: Jun. 18, 2010

(65) Prior Publication Data

US 2010/0322144 A1  Dec. 23, 2010

(30) Foreign Application Priority Data

Jun. 18, 2009 (KR) .................. 10-2009-0054420
Jul. 27, 2009 (KR) .................. 10-2009-0068326

(51) Int. Cl.
*H04J 1/10* (2006.01)
(52) U.S. Cl.
USPC ....................................... 370/315; 370/310
(58) Field of Classification Search
USPC ................. 370/252, 231, 230, 208, 329, 330, 370/431, 501, 310, 315, 474; 455/404.1, 455/436
See application file for complete search history.

(56) References Cited

U.S. PATENT DOCUMENTS

| | | | |
|---|---|---|---|
| 7,821,995 B2 * | 10/2010 | Das et al. ................. | 370/331 |
| 2006/0189334 A1 | 8/2006 | Wakabayashi | |
| 2009/0196177 A1 * | 8/2009 | Teyeb et al. .................. | 370/231 |
| 2010/0120392 A1 * | 5/2010 | Youn et al. ................. | 455/404.1 |
| 2010/0135166 A1 * | 6/2010 | Ahluwalia .................... | 370/252 |
| 2010/0150173 A1 * | 6/2010 | Yu et al. ........................ | 370/474 |
| 2010/0284314 A1 * | 11/2010 | Pelletier et al. ............... | 370/310 |
| 2011/0034145 A1 * | 2/2011 | Youn et al. ................. | 455/404.1 |
| 2011/0222428 A1 * | 9/2011 | Charbit et al. ................ | 370/252 |

* cited by examiner

*Primary Examiner* — Abdullah Riyami
(74) *Attorney, Agent, or Firm* — Nelson Mullins Riley & Scarborough LLP; EuiHoon Lee, Esq.

(57) ABSTRACT

Provided are a data transmission method in a communication system and a relay performing the same. The data transmission method in a communication system includes receiving, at a relay, an uplink buffer status report (BSR) of a terminal from the terminal, including the uplink BSR of the terminal received by the relay in an uplink BSR to be transmitted from the relay to a base station to generate a combined uplink BSR, and transmitting the combined uplink BSR to the base station even before the relay receives data stored in an uplink buffer of the terminal from the terminal. Accordingly, it is possible to reduce the transmission delay of the communication system including a relay.

18 Claims, 7 Drawing Sheets

DATA TRANSMISSION METHOD IN COMMUNICATION SYSTEM AND RELAY APPARATUS PERFORMING THE SAME

CLAIM FOR PRIORITY

This application claims priority to Korean Patent Applications No. 10-2009-0054420 filed on Jun. 18, 2009 and No. 10-2009-0068326 filed on Jul. 27, 2009 in the Korean Intellectual Property Office (KIPO), the entire contents of which are hereby incorporated by reference.

BACKGROUND

1. Technical Field

Example embodiments of the present invention relate in general to a data relay method in a mobile communication system, and more specifically to a data transmission method in a communication system using transmission of an uplink buffer status report (BSR) in a radio resource control process required for communication between a base station, relay and mobile terminal in a packet-based mobile communication system, and a relay performing the data transmission method.

2. Related Art

Third generation partnership project (3GPP), which is an asynchronous mobile communication standardization group, is working on standardization of long term evolution (LTE) to develop a next-generation mobile communication system standard. Also, to satisfy international mobile telecommunications (IMT)-Advanced requirements, development of an LTE-Advanced standard to complement the LTE standard is under way.

In general, a mobile communication system includes a base station constituting a cell, and a mobile terminal used by a user, and a plurality of mobile terminals exchange data with the base station. To extend the communication coverage of a base station and increase the communication capacity, a method in which the base station and a relay are wirelessly connected, and the relay relays communication between a terminal and the base station has been introduced.

A base station exchanges data with a terminal through a wireless channel so that the terminal can be connected with a wired network and perform communication. A mobile terminal can perform communication when the mobile terminal is located within the communication coverage of a base station, and uses a relay to extend the communication coverage. A relay is a node connected with a base station through a wireless channel, and serves to transfer data received from the base station to a terminal, and receive and transfer a wireless signal of the terminal to the base station.

Due to this advantage, a relay is frequently used. However, a relay added between a terminal and base station causes transmission delay sometimes.

SUMMARY

Accordingly, example embodiments of the present invention are provided to substantially obviate one or more problems due to limitations and disadvantages of the related art.

Example embodiments of the present invention provide a data transmission method in a communication system which minimizes transmission delay using transmission of an uplink buffer status report (BSR) in a radio resource control process required for communication between a base station, relay and mobile terminal in a packet-based mobile communication system.

In some example embodiments, a data transmission method in a communication system includes: receiving, at a relay, an uplink BSR of a terminal from the terminal; including the uplink BSR of the terminal received by the relay in an uplink BSR to be transmitted from the relay to a base station to generate a combined uplink BSR; and transmitting the combined uplink BSR to the base station even before data stored in an uplink buffer of the terminal is received from the terminal.

Here, information on an amount of data stored in an uplink buffer of the relay and the BSR of the terminal may be configured in one form, or may be separately configured as the combined uplink BSR.

Also, BSRs of at least two terminals may be configured in one form, or may be separately configured in different forms as the combined uplink BSR.

The combined uplink BSR may include comparison data between a combined uplink BSR previously transmitted by the relay and the current combined uplink BSR.

Data to be transmitted from the relay to the base station may be separately configured according to priority or quality of service (QoS) as the combined uplink BSR.

Here, the BSR of the terminal may include information indicating that there is no data in the buffer of the terminal.

The generating a combined uplink BSR may include including information on initial registration or registration termination of the terminal in the combined uplink BSR when the relay receives an initial registration or registration termination message of the terminal from the terminal.

The generating a combined uplink BSR may include including connection release information or idle-state switching information of the terminal in the combined uplink BSR when a connection between the relay and the terminal is released or the terminal is switched to an idle state.

The data transmission method may further include: receiving, at the relay, an uplink data transmission grant (UL grant) from the base station in response to the combined uplink BSR transmitted from the relay to the base station; and transmitting, at the relay, the data stored in the buffer of the terminal and received from the terminal to the base station.

The data transmission method may further include: transmitting, at the relay, an emergency transmission request to the base station when an amount of data to be transmitted from the relay to the base station exceeds a capacity of a buffer of the relay or there is data to be urgently transmitted; and receiving, at the base station, the emergency transmission request from the relay and transmitting a UL grant to the relay.

Here, the emergency transmission request may be made by a one-bit indicator transmitted through an uplink control channel or uplink data channel.

Further, a UL grant of the base station may be transmitted in response to the emergency transmission request of the relay using backhaul downlink resources or general downlink resources.

Also, the data transmission method may further include transmitting, at the relay, the uplink data to the base station using radio resources according to the UL grant received from the base station.

In other example embodiments, a relay apparatus receives an uplink BSR of a terminal from the terminal, includes the uplink BSR of the terminal in an uplink BSR to be transmitted to a base station to generate a combined uplink BSR, and transmits the combined uplink BSR to the base station even before data stored in an uplink buffer of the terminal is received from the terminal.

The combined uplink BSR may include comparison data between a combined uplink BSR previously transmitted by the relay and the current combined uplink BSR.

Also, the relay apparatus may receive a UL grant from the base station in response to the combined uplink BSR transmitted to the base station, and transmit the data stored in the buffer of the terminal and received from the terminal to the base station.

The relay apparatus may transmit an emergency transmission request to the base station when an amount of data to be transmitted to the base station exceeds a capacity of a buffer of the relay or there is data to be urgently transmitted.

Also, the relay apparatus may receive a UL grant from the base station in response to the emergency transmission request, and transmit the uplink data to the base station using radio resources according to the UL grant received from the base station.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS OF THE PRESENT INVENTION

Figure 1:
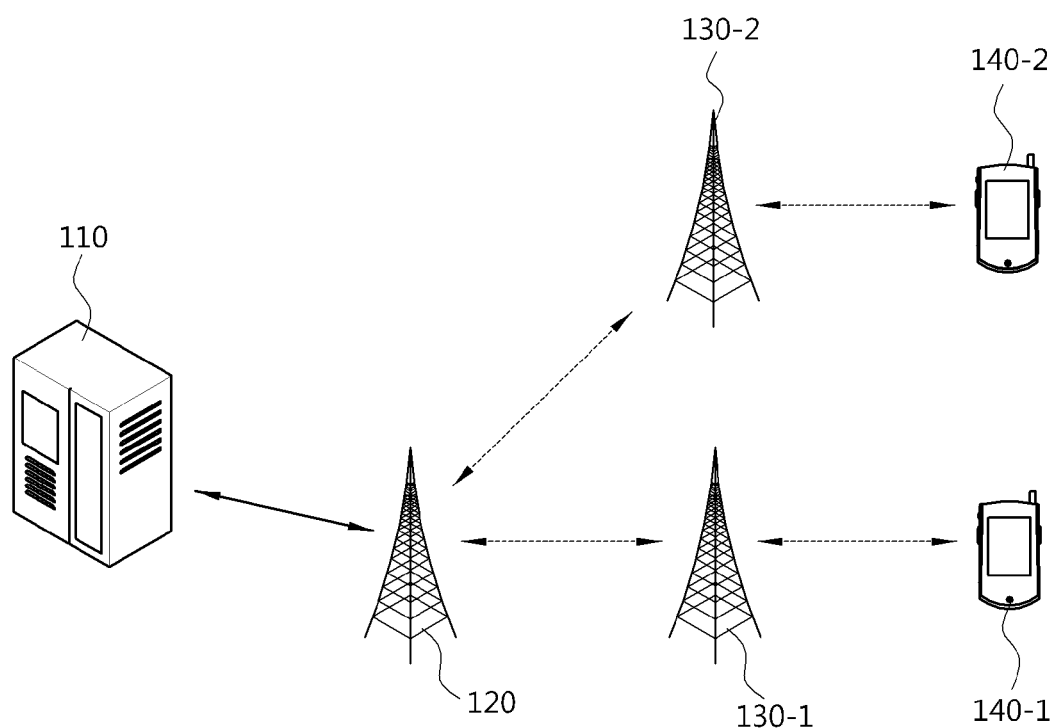
FIG. 1 shows a constitution of a mobile communication system employing a relay according to an exemplary embodiment of the present invention.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

The term "user equipment (UE)" may be referred to as a mobile station, mobile terminal, user terminal (UT), wireless terminal, access terminal (AT), terminal, subscriber unit, subscriber station (SS), wireless device, wireless communication device, wireless transmit/receive unit (WTRU), moving node, mobile, or other terms.

Various example embodiments of a UE may include a cellular phone, a smart phone having a wireless communication function, a personal digital assistant (PDA) having a wireless communication function, a wireless modem, a portable computer having a wireless communication function, a photographing apparatus such as a digital camera having a wireless communication function, a gaming apparatus having a wireless communication function, a music storing and playing appliance having a wireless communication function, an Internet home appliance capable of wireless Internet access and browsing, and also portable units or terminals having a combination of such functions, but are not limited to these.

The term "base station" may be referred to as a Node-B, evolved Node-B (eNB), base transceiver system (BTS), access point, and other terms.

The term "relay" may be referred to as a relay node (RN), relay station (RS), a relay apparatus, etc., and also may be referred to as a repeater, advanced repeater, etc. according to functions performed by the relay.

Exemplary embodiments of the present invention relate to a method of transmitting uplink data stored in the buffer of a terminal communicating with a relay to a base station with the minimum delay in a radio resource allocation scheme required for communication between the base station, the relay (or a base station performing a relay function), and a mobile terminal in a packet-based mobile communication system.

To be specific, in an exemplary embodiment of the present invention, a relay functioning as a base station reports not only information on the amount of data currently stored in the uplink buffer of the relay but also information on the amount of data to be received later from a terminal, to a base station.

Also, another exemplary embodiment of the present invention provides a method in which, when a relay cannot not normally receive data transmitted by a base station, the relay transmits an emergency transmission request indicator as well as an NACK signal to the base station, the base station retransmits the data in a general subframe, and thus transmission delay between the base station and the relay is reduced.

Further, still another exemplary embodiment of the present invention provides a method in which, when emergency data or data exceeding a buffer capacity is generated, the backhaul data is transmitted in a general subframe using an emergency transmission indicator or emergency transmission request.

Hereinafter, exemplary embodiments of the present invention will be described with reference to appended drawings.

FIG. 1 shows a constitution of a mobile communication system employing a relay according to an exemplary embodiment of the present invention.

Referring to FIG. 1, a mobile communication system according to an exemplary embodiment of the present invention includes a gateway 110, an eBN 120, relays 130-1 and 130-2, and terminals 140-1 and 140-2.

The gateway 110 is a node of a wired network, and functions to connect a wireless communication network with the wired network. The base station 120 is connected with the gateway 110 by wire, and performs wireless communication. The relays 130-1 and 130-2 are wirelessly connected with the base station 120, and support the terminals 140-1 and 140-2 located within their communication coverage to communicate with the gateway 110. To control terminals within their communication service areas, the relays 130-1 and 130-2 perform all functions which are performed by the general base station 120 to control terminals within the communication service area of the base station 120 itself. Wireless connection between a relay and the base station 120 uses frequency resources which are used when the base station 120 communicates with its terminal. When the corresponding wireless channel is in use, the radio resources of another frequency are used.

To transfer uplink data stored in a terminal communicating with a relay functioning as a base station to a wired network, a two-step process in which the terminal transmits the data to the relay and then the relay relays the data to the base station is generally used. In other words, the terminal is under the control of the relay and thus reports an uplink buffer status to the relay, and the relay reports the uplink buffer status to the base station to transfer data received from the terminal to the base station. As a result, delay is caused by transmission of information on the buffer status and data relay.

Figure 2:
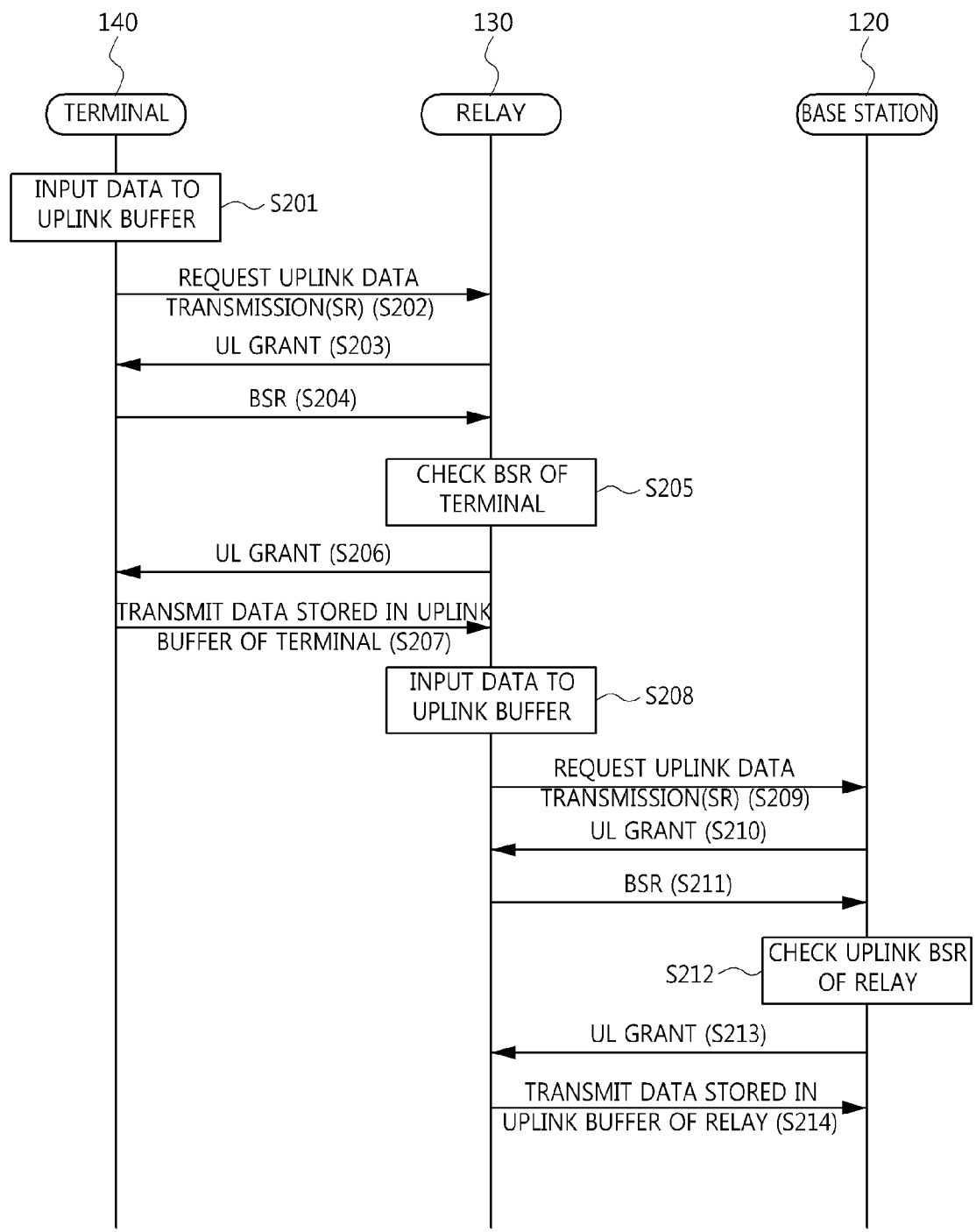
FIG. 2 illustrates a data transmission operation flow of a general packet-based mobile communication system including a relay.

FIG. 2 illustrates a data transmission operation flow of a general packet-based mobile communication system including a relay.

A general control process for a terminal under the control of a relay to transmit data to a base station will be described below.

When data is input to the uplink buffer of a terminal 140 (S201), the terminal 140 requests transmission of uplink data from the relay 130 using a scheduling request (SR) process or random access process (S202). p When the request is received, the relay 130 transmits uplink data transmission grant information (a UL grant), which denotes uplink resource allocation, to the terminal 140 (S203), and the terminal 140 transmits an uplink buffer status report (BSR) to the relay 130 (S204).

The relay 130 checks the BSR of the terminal 140 (S205), and then transmits a UL grant (S206), so that the terminal 140 transmits uplink data (S207).

When there is no relay between a terminal and base station, the terminal receives the UL grant and data stored in a buffer to the base station according to modulation information included in the UL grant, and the base station transfers the received data to a wired network.

However, the following process is performed in the communication system including a relay.

When the data transmitted by the terminal is received and input to the uplink buffer of the relay 130 (S208), the relay 130 reports a buffer status to the base station 120 using the same uplink data transmission process of the terminal 140 described above (S210 and S211), and relays the data to the base station 120 according to the UL grant received from the base station 120 (S214). Also, the base station 120 transmits a UL grant using the same process as the relay 130 (S210, S212, and S213), and receives the uplink data stored in the relay 130.

Figure 3:
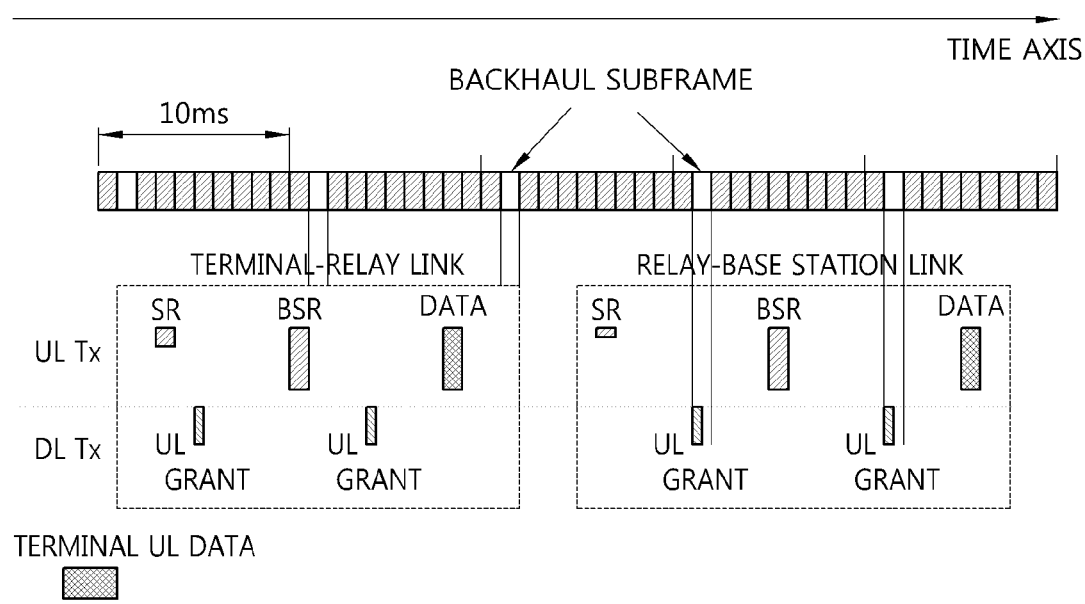
FIG. 3 illustrates an uplink wireless channel transmission structure of a general packet-based mobile communication system including a relay.

FIG. 3 illustrates an uplink wireless channel transmission structure of a general packet-based mobile communication system including a relay.

The uplink wireless channel transmission structure of FIG. 3 is a data transmission structure of a link between a terminal and a relay and a link between a relay and a base station on the assumption that a backhaul subframe is present per radio frame in a radio resource structure constituted of successive radio frames each corresponding to 10 ms along a time axis.

As can be seen from FIG. 3, in uplink transmission of a general packet-based mobile communication system, a transceiving operation begins in a link between a relay and a base station after data transmission from a terminal to the relay through a link between the terminal and the relay is completed.

On the other hand, in an exemplary embodiment of the present invention to be described with reference to FIGS. 4 and 5, a data exchange process between a terminal and a relay in a link between the terminal and the relay partially overlap an exchange process in a link between the relay and base station for a predetermined time.

Figure 4:
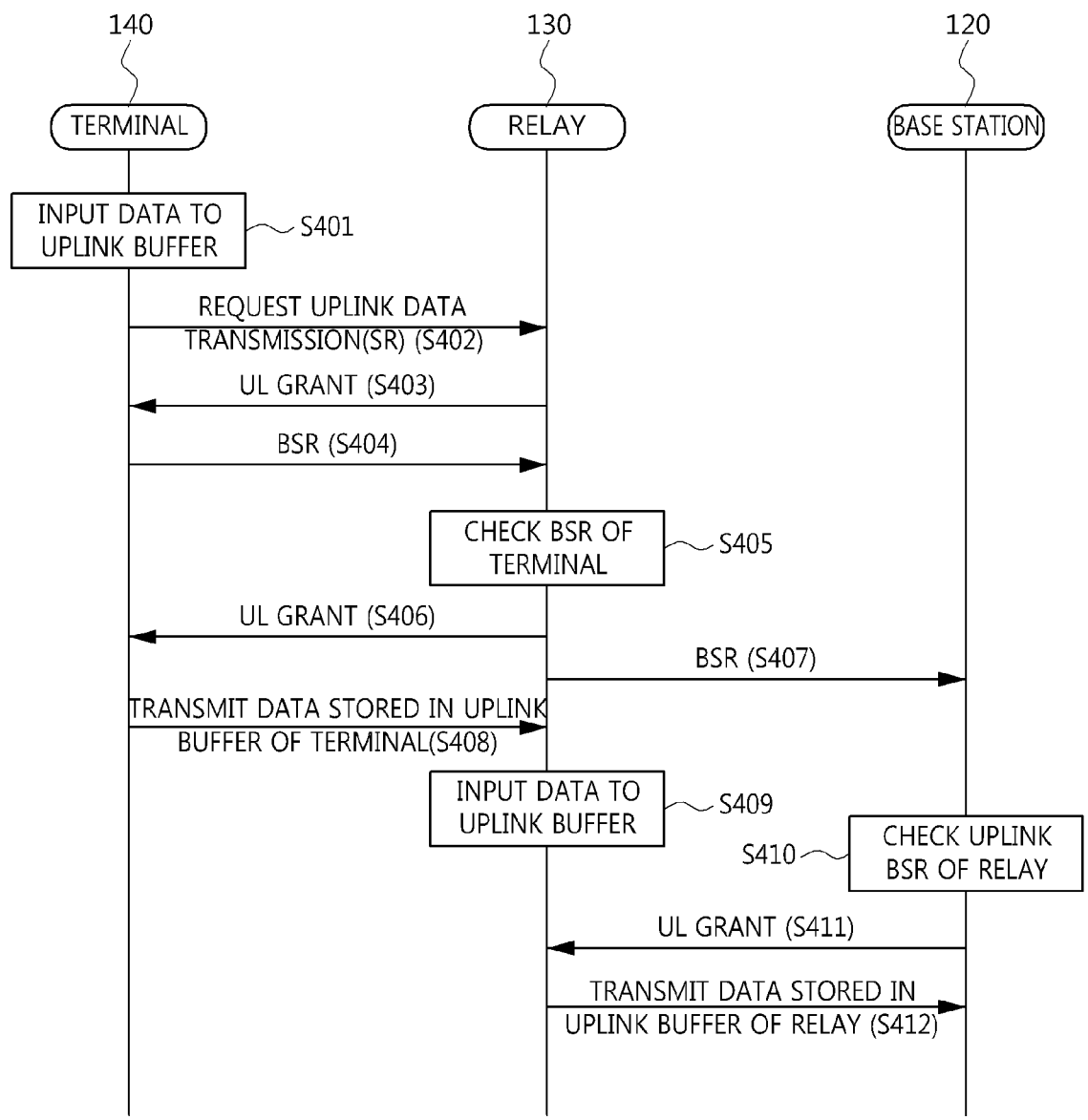
FIG. 4 illustrates an operation flow of a relay and a base station according to an exemplary embodiment of the present invention in a packet-based mobile communication system.

FIG. 4 illustrates an operation flow of a relay and a base station according to an exemplary embodiment of the present invention in a packet-based mobile communication system.

When data is input to the uplink buffer of a terminal 140 (S401), the terminal 140 requests transmission of uplink data from a relay 130 using an SR process or random access process (S402).

When the request is received, the relay 130 transmits a UL grant, which denotes uplink resource allocation, to the terminal 140 (S403), and the terminal 140 transmits an uplink BSR to the relay 130 (S404). The relay 130 checks the BSR of the terminal 140 (S405), and then transmits a UL grant required for data transmission to the terminal 140 (S406).

Aside from the process (S406) in which the relay 130 transmits the UL grant to the terminal 140, as soon as BSR is received from the terminal 140, the relay 130 may generate a BSR from the amount of data to be transmitted by the terminal 140 included in the BSR and transmit the BSR to a base station 120. Thus, in FIG. 4, the UL grant process (S406) in which the relay 130 transmits the UL grant to the terminal 140 and a BSR process (S407) in which the relay 130 transmits a BSR to the base station 120 can be performed in the reverse order, or at substantially the same time. Here, the relay 130 may adjust the BSR and transmit the BSR to the base station 120 in view of a channel status and load between the terminal 140 and the relay 130.

In exemplary embodiments of the present invention, a BSR that is transmitted from a relay to a base station will be referred to as a combined BSR to distinguish the BSR from a BSR that is transmitted from a terminal to the relay.

The feature of the present invention is that the BSR process (S407) in which the relay 130 transmits a BSR to the base station 120 can be performed not at the time when data is input to the buffer of the relay 130 but as soon as the relay 130 receives the BSR transmitted by the terminal 140. In other words, when the BSR of the terminal 140 is received, the relay 130 can transmit the BSR of the terminal 140 to the base station 120 even before data stored in the buffer of the terminal 140 is received.

Here, the uplink BSR transmitted to the base station 120 by the relay 130 may include information on the amount of data stored in the uplink buffer of the relay 130.

Also, when the BSR of the terminal 140 is received from the terminal 140, the relay 130 may generate one BSR indicating a buffer status of the relay 130 using the BSR of the relay 130 indicating the amount of data currently stored in the uplink buffer of the relay 130 and the BSR of the terminal 140 received from the terminal 140 and transmit the uplink BSR to the base station 120, or separately transmit the BSR of the relay 130 and the BSR of the terminal 140 received from the terminal 140 to the base station 120.

The terminal 140 receiving the UL grant from the relay 130 transmits data stored in the uplink buffer of the terminal 140 (S408). The data transmitted by the terminal 140 is input to the uplink buffer of the relay 130 (S409).

The base station 120 checks and calculates the BSR received from the relay 130 (S410), and transmits a UL grant to the relay 130 (S411). Here, the UL grant is information on uplink radio resources used when the relay 130 transmits data to the base station 120, and the size of the radio resources can be determined in view of the amount of data expected to be received from the terminal 140 by the relay 130.

When the UL grant is received, the relay 130 modulates data stored in the buffer and transmits the modulated data to the base station 120 (S412). When the data to be received from the terminal 140 is input to the buffer (S409), the relay 130 also transmits the received data.

In general, a data transmission period between a relay and a base station is larger than a data transmission period between a terminal and the relay. Thus, a BSR transmitted by the terminal is input to the buffer of the relay when the relay transmits data, and the relay can transmit the data without delay. In FIG. 4, the step (S409) in which the relay 130 receives data from the terminal 140 and the data is input to the uplink buffer of the relay 130 and the step (S410) in which the base station 120 checks the uplink buffer status of the relay 130 are shown to have a time difference merely for convenience. In other words, the two steps (S409 and S410) may be performed in the reverse order, or at substantially the same time.

Figure 5:
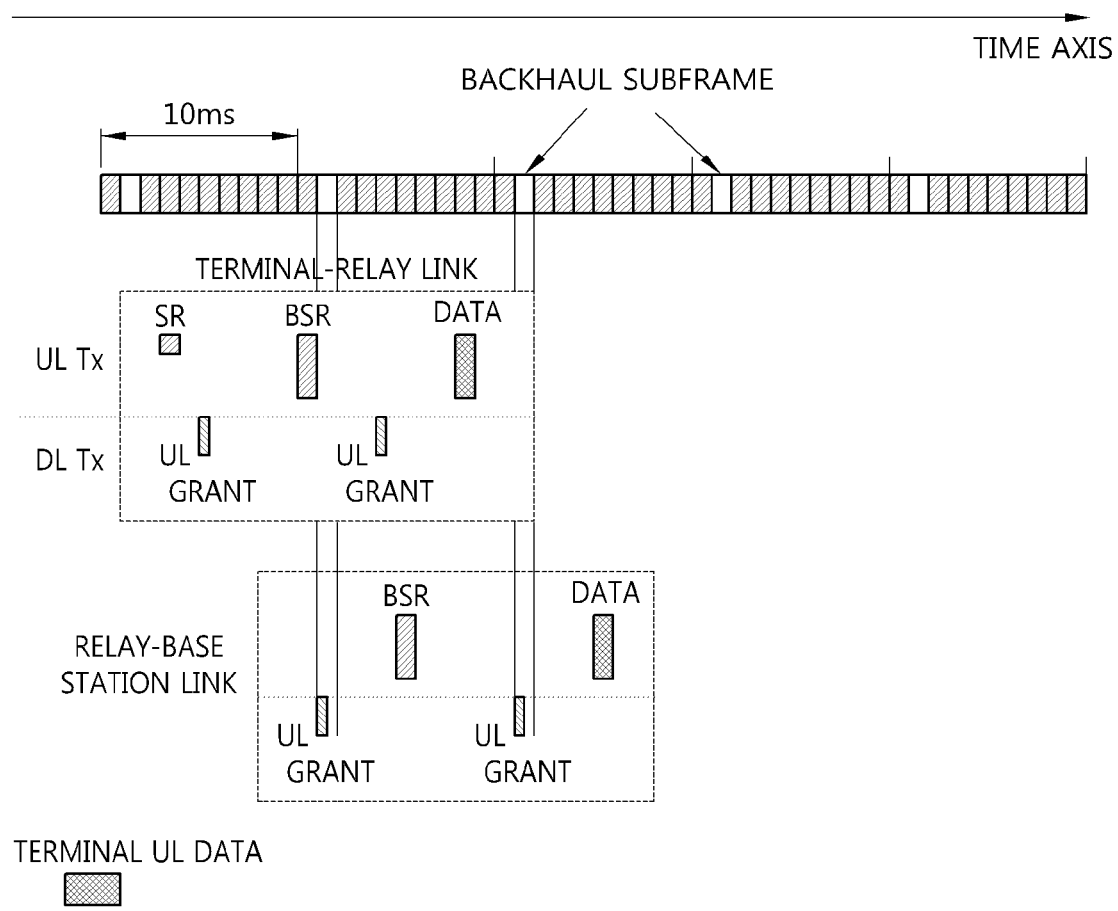
FIG. 5 illustrates an uplink wireless channel transmission structure according to an exemplary embodiment of the present invention in a packet-based mobile communication system.

FIG. 5 illustrates an uplink wireless channel transmission structure according to an exemplary embodiment of the present invention in a packet-based mobile communication system.

The uplink wireless channel transmission structure of FIG. 5 is a transmission structure of a link between a terminal and a relay and a link between a relay and a base station on the assumption that a backhaul subframe is present per radio frame in a radio resource structure constituted of successive radio frames each corresponding to 10 ms along a time axis.

It can be seen from FIG. 5 that operation begins in a link between a relay and a base station even before data exchange in a link between a terminal and the relay is completed. In other words, after the relay receives a BSR from a terminal and before the relay receives actual data from the terminal, the relay transmits a combined BSR to the base station. Thus, a transceiving operation between the relay and the base station partially overlaps a transceiving operation between the terminal and the relay for a predetermined time, so that overall data transmission delay can be reduced.

Meanwhile, an uplink BSR transmitted from a relay to a base station can have one form or at least two combinable forms among the following various forms:

a form and method in which information on the amount of data stored in the buffer of a relay and a BSR received from a terminal by the relay are configured in one, a form and method in which information on the amount of data stored in the buffer of a relay and a BSR received from a terminal by the relay are separately configured, a form and method in which a relay separately configures BSRs according to terminals, a form and method in which a relay configures a plurality of terminal BSRs together, a form and method in which a relay separately configures data to be transmitted to a base station according to priority or quality of service (QoS), and a form and method in which a relay transmits a current BSR with a sign of increase or decrease after comparing a previously transmitted BSR with the current BSR.

A point in time and condition for configuring an uplink BSR transmitted from a relay to a base station may be in accordance with one condition or at least two combinable conditions among the following conditions:

a case in which the amount of data stored in the uplink buffer of a relay is changed, a case in which the priority of data stored in the uplink buffer of a relay is changed, a case in which a relay initializes the status of an uplink buffer, a case in which a BSR is received from a terminal, a case in which a BSR indicating that there is no data in the buffer of a terminal is received, a case in which a terminal is initially registered with a relay, or registration of a terminal is terminated, and a case in which a terminal releases connection with a relay, or switches to an idle state.

In other words, even when a BSR of a terminal is not received, a relay can generate and transmit a BSR of the relay itself to a base station. Also, when a padding BSR indicating that data of meaningless information is transmitted is received from a terminal, a relay removes the corresponding portion to configure a BSR.

The above-mentioned forms of a BSR, and the above-mentioned points in time and conditions constituting an uplink BSR may be set in the form of a combination in view of a system constitution.

For example, an uplink BSR of a relay in view of a plurality of terminals requiring data transmission in the service area of the relay can be managed by the relay, a base station, or the relay and base station. When a BSR of a relay is generated and transmitted in view of a current relay buffer status and an estimated buffer status based on a BSR received from a terminal, the following method can be used for the relay to transmit the BSR to a base station.

The BSR of the relay may be an absolute BSR in view of the current relay buffer status and the estimated buffer status based on the BSR received from the terminal, or may denote only a difference between the absolute BSR and an absolute BSR transmitted last. To this end, an indicator may be added to the BSR.

Also, a condition for transmitting an absolute BSR and a condition for transmitting a BSR denoting only a difference may be separately applied. At this time, each of the conditions may correspond to the above-mentioned points in time and conditions constituting a BSR.

Downlink data transmission in a communication system including a relay will be described below.

Figure 6:
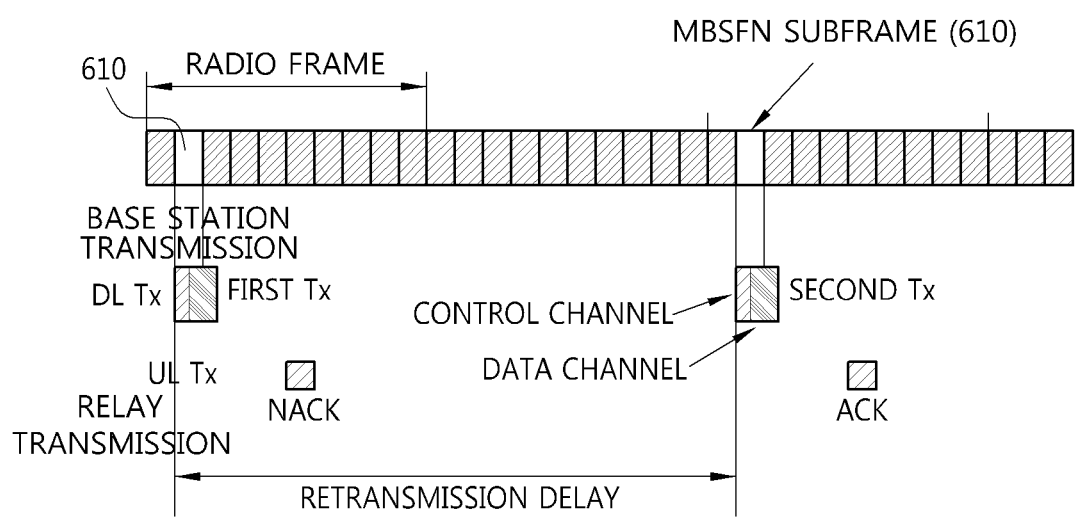
FIG. 6 illustrates a downlink data transmission structure of a general packet-based mobile communication system including a relay.

FIG. 6 illustrates a downlink data transmission structure of a general packet-based mobile communication system including a relay.

When a relay performs the relay function, the relay performs only one of a transmitting operation and a receiving operation according to time. A time section in which the relay receives downlink data of a base station is a backhaul subframe section, and in a normal subframe time section, the relay transmits downlink data to a terminal controlled by the relay itself. In the normal subframe time section, the base station also transmits downlink data to a terminal controlled by the base station itself. Likewise, an uplink operation time section of the relay can be divided into a transmitting time section and a receiving time section, which is performed by the base station.

Using this structure, the base station transmits (first Tx) downlink data in a backhaul subframe to the relay, and the relay reports demodulation result (success or failure) information to the base station after receiving the data. When the base station is informed of failure of reception (NACK) by the relay, the base station retransmits (second Tx) the corresponding data, which is enabled in the next backhaul subframe.

However, the ratio of a backhaul subframe in one radio frame is not always high. FIG. 6 shows a case in which a multicast broadcast single frequency network (MBSFN) subframe is used as a backhaul subframe, and the interval of MBSFN subframes is two radio frames. When the time period of a backhaul subframe is this long, there is a long delay in a relay receiving retransmitted data, and thus a large data transmission delay occurs in an overall system.

For this reason, an exemplary embodiment of the present invention provides a method for a base station to transmit retransmission data using a general subframe, which will be described in detail with reference to FIG. 7.

Figure 7:
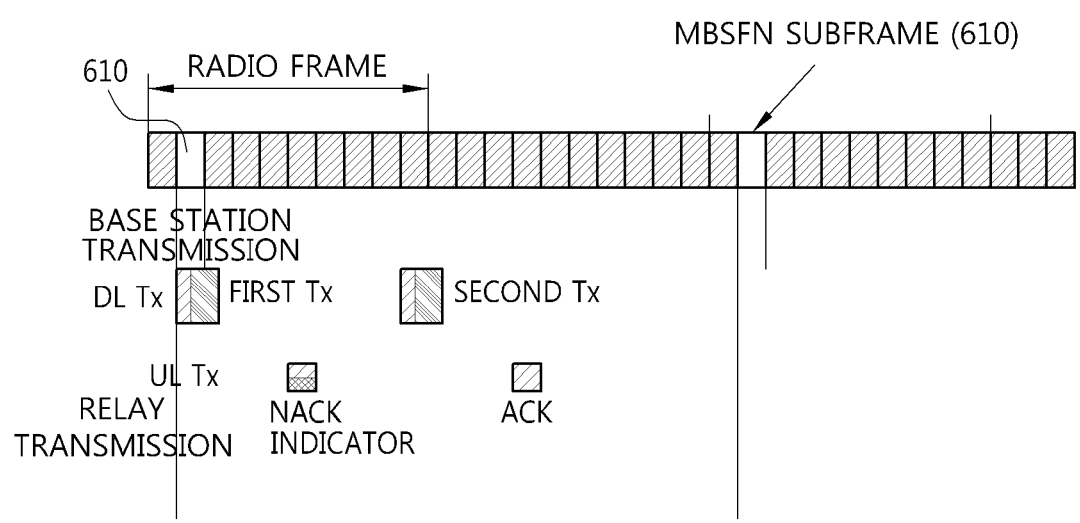
FIG. 7 illustrates a downlink data transmission structure of a packet-based mobile communication system including a relay according to an exemplary embodiment of the present invention.

FIG. 7 illustrates a downlink data transmission structure of a packet-based mobile communication system including a relay according to an exemplary embodiment of the present invention.

When a relay receives downlink data transmitted by a base station and then transmits demodulation result information to the base station using a downlink data transmission method according to an exemplary embodiment of the present invention, the relay includes the demodulation result information and an indicator indicating an emergency transmission request, for example, an indicator indicating failure of transmission as shown in FIG. 7 in an NACK message, and transmits the NACK message to the base station through an uplink.

The emergency transmission request indicator may consist of one bit, and is transmitted through a physical uplink control channel (PUCCH). The emergency transmission request indicator may also be transmitted using an SR field used to request uplink data transmission. In brief, a base station transmits retransmission data to a relay at a general subframe time without waiting until a backhaul subframe time at which it is possible to transmit retransmission data.

When the emergency transmission request is received from the relay, the base station retransmits (second Tx) data to the relay not in a general subframe but in a backhaul subframe. When the base station retransmits backhaul data using a general subframe time section, the backhaul data is transmitted through a downlink channel used by a general terminal, and detailed radio resource information is selected by the base station. A control channel (or a physical downlink control channel (PDCCH)) and data channel (or a physical downlink shared channel (PDSCH)) used at this time are marked with a terminal identifier (or a cell radio network temporary identifier (C-RNTI)) or relay identifier that is allocated to the relay by the base station, so that the channels can be identified.

Thus far, a method of applying an emergency transmission request to downlink retransmission has been described with reference to FIG. 7.

The downlink transmission method according to an exemplary embodiment of the present invention can also be applied to a case in which a base station has a large amount of data to transmit to a relay, or data to be urgently transmitted is generated.

In other words, to transmit backhaul data to a relay at a general subframe time, a base station may transmit a control message instructing the relay to receive a general subframe (i.e., an emergency transmission indicator instructing the relay to receive emergency transmission) to the relay in a backhaul subframe time section. The control message may be transmitted through a data channel (R-PDSCH) used by a backhaul subframe, and may include a receiving start time, receiving end time, etc.

The base station transmits the data to the relay at a general subframe time after transmitting the control message. A control channel (or a PDCCH) and data channel (or a PDSCH) used at this time are marked with a terminal identifier (or a C-RNTI) or relay identifier that is allocated to the relay by the base station, so that the channels can be identified.

When the control message is received from the base station, the relay receives the data transmitted by the base station in a general subframe. After receiving the control message, the relay transmits a demodulation result and a response message to the base station. When the relay cannot immediately follow the instruction of the base station, the relay transmits the response message indicating rejection of operation or operation delay to the base station.

Using this process, it is possible to solve the problem of data to be transmitted to the relay by the base station being delayed at the base station.

Meanwhile, the present invention provides an exemplary embodiment in which such emergency transmission is also applied to an uplink.

In other words, when there is a large amount of data to be transmitted from a relay to a base station or data to be urgently transmitted is generated, the relay may transmit an emergency transmission request to the base station through an uplink. As the emergency transmission request, for example, one bit indicator is transmitted through a PUCCH or physical uplink shared channel (PUSCH). This indicator indicates whether or not the corresponding data needs to be urgently transmitted, and may indicate the amount of the data and QoS information.

When the emergency transmission request is received from the relay, the base station transmits a UL grant to the relay, and the UL grant may be transmitted at a backhaul subframe time or general subframe time. The UL grant transmitted in a backhaul subframe may include information on a time at which the relay transmits uplink data, and the relay transmits uplink data to the base station using designated time and radio resources according to the information.

In another exemplary embodiment of the present invention for reducing uplink transmission delay, a base station may periodically allocate uplink radio resources for transmitting uplink data or a BSR of a relay. The relay transmits the BSR using the periodically allocated resources. The period and location information on the radio resources may be fixed by the base station for a predetermine time. A general uplink transmission process requires a UL grant of a base station, and thus delay may occur. Also, a downlink channel through which a base station transmits data to a relay is divided according to time, and the base station can transmit a UL grant to the relay only in a designated time section (e.g., MBSFN subframe). Thus, when the relay periodically transmits uplink data without using a UL grant, delay can be reduced.

The above-described exemplary embodiments of the present invention, particularly, a method and process of configuring buffer information, can be applied to a remote radio entity (RRE) through which a base station and a relay are connected not wirelessly but by wire in view of a situation in which terminals in the service area of a relay perform uplink transmission or are estimated to perform uplink transmission in a wireless network using the relay. In other words, the RRE may be located between terminals within its service area and the base station and employ a method and process of configuring buffer information according to an exemplary embodiment of the present invention to transmit a BSR of the RRE itself to the base station without delay.

In an exemplary embodiment of the present invention, a base station can obtain information on the amount of uplink data to be transmitted from a relay to the base station itself in advance and allocate radio resources, so that the transmission delay of an overall system can be reduced.

While the example embodiments of the present invention and their advantages have been described in detail, it should be understood that various changes, substitutions and alterations may be made herein without departing from the scope of the invention.

What is claimed is:

1. A data transmission method in a communication system, comprising:
    receiving, at a relay, a first uplink buffer status report (BSR) of a terminal from the terminal;
    including the first uplink BSR of the terminal received by the relay in a second uplink BSR to be transmitted from the relay to a base station; and
    transmitting the second uplink BSR to the base station even before data stored in an uplink buffer of the terminal is received from the terminal,
    wherein the second uplink BSR includes comparison data between a second uplink BSR previously transmitted by the relay and the current second uplink BSR.

2. The data transmission method of claim 1, wherein information on an amount of data stored in an uplink buffer of the relay and the first uplink BSR of the terminal are configured in one as the second uplink BSR.

3. The data transmission method of claim 1, wherein information on an amount of data stored in an uplink buffer of the relay and the first uplink BSR of the terminal are separately configured as the second uplink BSR.

4. The data transmission method of claim 1, wherein the first uplink BSRs of at least two terminals are configured in one as the second uplink BSR.

5. The data transmission method of claim 1, wherein the first uplink BSRs of at least two terminals are separately configured as the second uplink BSR.

6. The data transmission method of claim 1, wherein data to be transmitted from the relay to the base station is separately configured according to priority or quality of service (QoS) as the second uplink BSR.

7. The data transmission method of claim 1, wherein the first uplink BSR of the terminal includes information indicating that there is no data in the buffer of the terminal.

8. The data transmission method of claim 1, wherein the generating the second uplink BSR includes including information on initial registration or registration termination of the terminal in the second uplink BSR when the relay receives an initial registration message or a registration termination message of the terminal from the terminal.

9. The data transmission method of claim 1, wherein the generating the second uplink BSR includes including connection release information or idle-state switching information of the terminal in the second uplink BSR when a connection between the relay and the terminal is released or the terminal is switched to an idle state.

10. The data transmission method of claim 1, further comprising:
    receiving, at the relay, an uplink data transmission grant (UL grant) from the base station in response to the second uplink BSR transmitted from the relay to the base station; and
    transmitting, at the relay, the data stored in the buffer of the terminal and received from the terminal to the base station.

11. The data transmission method of claim 10, further comprising:
    transmitting, at the relay, an emergency transmission request to the base station when an amount of data to be transmitted from the relay to the base station exceeds a capacity of a buffer of the relay or there is data to be urgently transmitted; and
    receiving, at the base station, the emergency transmission request from the relay and transmitting a UL grant to the relay.

12. The data transmission method of claim 11, wherein the emergency transmission request is made by a one-bit indicator transmitted through an uplink control channel or uplink data channel.

13. The data transmission method of claim 11, wherein a UL grant of the base station is transmitted in response to the emergency transmission request of the relay using backhaul downlink resources or general downlink resources.

14. The data transmission method of claim 10, further comprising transmitting, at the relay, the uplink data to the base station using radio resources according to the UL grant received from the base station.

15. A relay apparatus, comprising:
    an uplink buffer configured to store data to be transmitted to a base station; and a processor configured to receive a first uplink buffer status report (BSR) of a terminal from the terminal, to include the first uplink BSR of the terminal in a second uplink BSR to be transmitted to a base station, and to transmit the second uplink BSR to the base station even before data stored in the uplink buffer of the terminal is received from the terminal, wherein the second uplink BSR includes comparison data between a second uplink BSR previously transmitted by the relay and the current second uplink BSR.

16. The relay apparatus of claim 15, wherein the processor receives an uplink data transmission grant (UL grant) from the base station in response to the second uplink BSR transmitted to the base station, and transmits the data received from the terminal, to the base station.

17. The relay apparatus of claim 16, wherein the processor transmits an emergency transmission request to the base station when an amount of data to be transmitted to the base station exceeds a capacity of the uplink buffer or there is data to be urgently transmitted.

18. The relay apparatus of claim 17, wherein the processor receives a UL grant from the base station in response to the emergency transmission request, and transmits the uplink data to the base station using radio resources according to the UL grant received from the base station.

* * * * *